United States Patent
De Weerd

(10) Patent No.: US 8,838,172 B2
(45) Date of Patent: Sep. 16, 2014

(54) CONNECTOR FOR CONNECTING AT LEAST ONE OUTPUT DEVICE TO A RENDERING DEVICE AND METHOD FOR MANAGING CONNECTIONS

(76) Inventor: Jeroen De Weerd, Valkenburg (NL)

( * ) Notice: Subject to any disclaimer, the term of this patent is extended or adjusted under 35 U.S.C. 154(b) by 647 days.

(21) Appl. No.: 12/735,109

(22) PCT Filed: Dec. 17, 2007

(86) PCT No.: PCT/EP2007/064099
§ 371 (c)(1),
(2), (4) Date: Jan. 21, 2011

(87) PCT Pub. No.: WO2009/077006
PCT Pub. Date: Jun. 25, 2009

(65) Prior Publication Data
US 2011/0111801 A1    May 12, 2011

(51) Int. Cl.
*H04H 40/00* (2008.01)
*H04B 7/00* (2006.01)
*H04M 1/00* (2006.01)

(52) U.S. Cl.
USPC ........ 455/557; 455/3.06; 455/41.2; 455/41.3; 455/66.1

(58) Field of Classification Search
CPC ......... H04W 4/00; H04W 4/18; H04W 24/00; H04W 24/04; H04W 48/18; H04W 52/44; H04W 84/12; H04W 84/20; H04W 88/00; H04W 88/02; H04W 92/02; H04W 92/04; H04W 4/04
USPC ........ 455/3.06, 41.2–41.3, 401, 412.1–412.2, 455/414.1, 418–420, 500, 550.1, 552.1, 455/556.1–556.2, 557–559, 566–567, 455/569.1–569.2, 575.2, 11.1, 41.2–42.3, 455/63.3, 66.1, 67.7, 68, 71, 74, 90.2, 455/92–93, 423–425, 454, 511
See application file for complete search history.

(56) References Cited

U.S. PATENT DOCUMENTS

| | | | | |
|---|---|---|---|---|
| 6,122,366 | A * | 9/2000 | Veschi | 379/373.02 |
| 7,257,398 | B1 * | 8/2007 | Ukita et al. | 455/420 |
| 7,920,903 | B2 * | 4/2011 | Ueda et al. | 455/575.1 |
| 2003/0022703 | A1* | 1/2003 | Reshefsky | 455/569 |
| 2005/0027385 | A1* | 2/2005 | Yueh | 700/94 |
| 2006/0258406 | A1* | 11/2006 | Igarashi et al. | 455/567 |

(Continued)

FOREIGN PATENT DOCUMENTS

| | | |
|---|---|---|
| EP | 1 850 569 | 10/2007 |
| JP | 11-154994 | 6/1999 |
| JP | 2001-103135 | 4/2001 |
| WO | WO 00/70779 | 11/2000 |

*Primary Examiner* — Meless Zewdu
(74) *Attorney, Agent, or Firm* — Pandiscio & Pandiscio

(57) ABSTRACT

A connector for connecting at least one output device to a rendering device, wherein the connector includes at least one detection unit for detecting at least one external signal, characterized in that the connector comprises at least one communication unit for communicating with at least one wireless communication device wirelessly, wherein the detection unit is connected to the communication unit for managing the communication unit, and a method for managing connections to an output device from a rendering and/or a communication device, wherein the output device is connected to a connector for connecting the output device to the rendering and/or communication device, characterized in that the connector upon detection of a specific external signal which was detected wirelessly activates a communication unit of the connector for communication with the communication device.

26 Claims, 3 Drawing Sheets

(56) References Cited

U.S. PATENT DOCUMENTS

| | | | |
|---|---|---|---|
| 2007/0154052 A1* | 7/2007 | Gantz | 381/384 |
| 2007/0173232 A1* | 7/2007 | Kuo et al. | 455/412.2 |
| 2007/0225035 A1 | 9/2007 | Gauger et al. | |
| 2007/0270196 A1* | 11/2007 | Wu | 455/575.2 |
| 2007/0281751 A1* | 12/2007 | Bauchot et al. | 455/567 |
| 2009/0143103 A1* | 6/2009 | Chishti et al. | 455/558 |

* cited by examiner

CONNECTOR FOR CONNECTING AT LEAST ONE OUTPUT DEVICE TO A RENDERING DEVICE AND METHOD FOR MANAGING CONNECTIONS

FIELD OF THE INVENTION

The present invention relates to a connector for connecting at least one output device to a rendering device and to a method for managing connections.

BACKGROUND OF THE INVENTION

Mobile phones have become a preferred solution to ensure that a user can be reached regardless of his current location. In order to successfully establish a communication connection with the user of the mobile phone, it is, however, mandatory that the user will be alerted when a call comes in. In general a ring tone will inform the user accordingly. Also vibrating systems have been introduced to indicate an incoming call.

These known solutions, however, require that the user is either close enough to the mobile phone to feel the vibration and/or is able to hear the ring tone. Especially the latter requirement is often not fulfilled. If the user is for example listening to music or watching TV, the volume of the media output to him may be turned up to high and may not allow the user to hear the ring tone. Also in the event where the user is wearing a head set or earphones to listen to the media, he will not be aware of an incoming call, as he will not hear the ring tone.

In order to address this problem, enhanced acoustic devices have been suggested, wherein a control system is implemented to stop the rendering of music or other audio, when an incoming phone call reaches a mobile phone. Such an enhanced acoustic device is for example described in JP 2001 10 31 35 A. One disadvantage of this solution is that the usages of other devices, which the user may already own and which are not provided with the control system, will still bear the risk of missing a call.

JP 11154994A describes a notification device which can be attached to a rendering device to notify a user, who is listening to content being rendered from the rendering device via wired head phones, of an incoming call on his mobile phone. The notification device will either interrupt or mix the rendered signal with a notification signal informing the user about the call. One drawback of this solution is that the user will have to take his head phones off in order to be able to answer the incoming call.

Furthermore, headsets for mobile phones are known which include a microphone. These headsets may communicate with the mobile phone and any other device via a personal area network and may in particular set up a Bluetooth connection to the respective device. These solutions have two major drawbacks. Firstly, the headsets intended to be used for mobile phones generally have a lower quality of sound output. Secondly, these headsets not only require the mobile phone but also any other device which is to be used with the headsets to be Bluetooth enabled. Finally, the communication between the headset and the mobile phone will only be possible, if the headset is paired with the mobile device. The active or paired headset will, however, consume a considerable amount of power.

The problem to be solved by the present invention is thus to overcome these drawbacks of the prior art solutions and in particular to provide a solution for easy communication management with legacy headsets and legacy music and video players.

SUMMARY OF THE INVENTION

The invention is based on the finding that the problem can be solved by providing means to manage the connection of an output device to a rendering device as well as to other devices within the connection itself.

According to a first aspect, the present invention relates to a connector for connecting at least one output device to a rendering device, where the connector comprises at least one detection unit for detecting at least one external signal. The connector is characterized in that it comprises at least one communication unit for communicating with at least one wireless communication device wirelessly, wherein the detection unit is connected to the communication unit for managing the communication unit.

The wireless communication device may be the rendering device to which the output device is to be connected. In this case, the connection from the rendering device to the connector is realized wirelessly. According to the invention, the wireless communication device may, however, preferably be a device different from the rendering device. In this case, the connection from the rendering device to the connector may be a wired connection or the connector may be integrated in or attached to the rendering device.

The rendering device may be any device capable of providing a signal to be output via an output device. In particular, the rendering device is a device for rendering audio content and emitting audio signals to an output device. The rendering device may be a device for rendering media, such as a stereo system, a TV, a CD-Player, a DVD player. Preferably, the device is portable such as an MP3-player or Ipod®. The rendering device may also be a device connectable to a communication network. In this case, the rendering device may for example be a mobile phone.

The communication device with which the communication unit can communicate is preferably a mobile phone.

The output device is preferably a headset or earphones for audio output. The output device may, however, also be a display screen or other output device for video output. The output device is preferably connected to the rendering device in a wired fashion, i.e. by a cable which may be part of the output device or could be connected thereto. It is, however, also possible that the connection between the connector and the output device is wireless.

The external signal is a signal different from video or audio signals and also different from control signals or communication signals of units of the connector. The external signal may be a signal originating from a device which is different to the rendering device and the output device. Preferably, the external signal originates from the wireless communication device which can communicate with the communication unit of the connector. The external signal may preferably be an electromagnetic wave signal in the frequency range of a mobile communication network, for example 900 MHz.

The detection unit detects external signals without necessitating a predetermined connection to the device from which the external signal originates to be established beforehand. One possible embodiment of the detection unit may comprise a diode.

The detection unit may be set to and/or can be adjusted to detect signals in the frequency range of control channels of a mobile communication standard, in particular GSM, UMTS and/or any 3G or 4G-standard. The frequency range may be for example 890-915 MHz and/or 935-960 MHz for a GSM-800 standard network. It is to be noted that the indicated frequency bands are only examples and that the detection unit may be set to and/or adjusted to any frequency band which is being used in the respective mobile communication network. By monitoring signals within such frequency ranges, signals on control channels can be detected. Hence, the connector will be able to detect signals such as the call setup signal, which is generated by a mobile phone, when a call comes in. The connector may be set to only detect a specific sequence of signals in this frequency range representative of for example the call setup signal. In addition or alternatively, the detection may be set to only detect signals of specific signal strength. Thereby signals originating form a mobile phone close to the user will be detected, whereas other signals within this frequency range originating from other mobile phones will be ignored.

By connecting the detection unit of the connector to the communication unit of the connector, the detection unit can control at least part of the functionality of the communication unit. In particular, the establishing of a wireless communication connection of the communication unit with a communication device can be initiated by activating the communication unit from the detection unit. Thereby, a communication connection between the connector and the wireless communication device can be managed according to specific events which are detected by the detection unit. For example, a communication connection may be established upon detection of an incoming call. Thereby, the output device can be used for communication to a third party via the communication device. One further advantage of connecting the detection unit to the communication unit is that the communication unit, especially when being realized as a Bluetooth unit and thus consuming considerable amount of energy, will only be activated when needed. Thereby, the power consumption of the connector can be minimized. The communication unit will hereinafter also be referred to as a Bluetooth unit. Finally, the provision of a communication unit which may be used for a communication connection with a communication device within the connector is advantageous in that the output device, e.g. headset does not have to be enabled for the wireless communication, e.g. via Bluetooth. The output device may be connected to the connector via a wire or cable and will still be usable for the wireless communication with the communication device.

In a preferred embodiment, the connector comprises an interruption unit for managing the connection of the rendering device to the output device. Especially in cases, where the rendering device is a different device than the communication device, the interruption unit may interrupt the transmission of signals from the rendering device to the output device and may in particular transmit signals received via the communication unit of the connector to the output device. Thereby, the input signal to be transmitted to and to be output at the output device can be set to be a signal received from the communication device instead of signals received from the rendering device. The interruption unit may also previous to transmission of the signal from the communication unit, input a ring tone or other alert to inform the user of an incoming call. The interruption unit may include an interruption element such as a switch or a relay, e.g. a solid-state relay. The interruption element is preferably reversible so that the connection from the rendering device to the output device may be re-established once the user has been informed on for example the incoming call and the call is terminated or has been rejected.

The interruption unit may comprise means for inputting a preset audio signal into the connection from the connector to the output device. The means for inputting the preset audio signal may include a storage unit, where the preset audio signal is being stored. The interruption element used to interrupt the connection between the rendering device and the output device may also be used to establish a connection to the storage device. In this case the interruption element is preferably a switch. By inputting a preset audio signal for example a ring tone can be fed to the output device. This is advantageous in that the user will be able to identify the reason for the interruption of audio output from the rendering device. In particular, if the interruption unit only disconnects the transmission of audio signals from the rendering device to the output device for a short period of time, the user may mistake the interruption to be part of the audio signal of the rendering device, e.g. a pause between songs.

The interruption unit may be connected to the detection unit. In this case, the signal transmission from the rendering device to the output device may be interrupted once a preset signal or a signal sequence is detected by the detection unit. Alternatively or additionally, the communication unit may be connected to the interruption unit. This connection allows for an interruption of the transmission of signals from the rendering device to the output device, once a communication connection with a communication device has been set up. In such a communication connection, the existence of an incoming call at the communication device can be verified. The connection of the communication unit to the interruption unit has the further advantage that signals received at the communication unit, in particular audio signals, can easily be provided to the interruption unit to be transmitted to the output device instead of signals from the rendering device.

The communication unit of the connector is preferably a personal area network communication unit, in particular a Bluetooth unit. This unit allows for reliable and easy connection between the connector and the communication device without necessitating a network such as a cellular network to be present.

According to one embodiment, the connector comprises an adjustment unit for adjusting the detection unit, in particular for adjusting the settings of the detection unit. The adjustment unit is preferably laid out to adjust the sensitivity of the detection unit. The adjustment unit may be accessed by the user and the respective settings may thus be set by the user. For this purpose, the connector preferably comprises input means such as an adjustment button or knob.

By providing the possibility to adjust the sensitivity of the detection unit or other settings such as settings of a filter within the detection unit, it will be possible to limit the detected signals to signals of relevance for the user. If the signals to be detected originate from the mobile phone of the user, it can be assumed that the mobile phone will be close to the connector and the sensitivity can thus be set to be low. Thereby, for example only signals having signal strength above a preset threshold value will be detected. This means that only signals from devices close to the connector will then be detected by the detection unit and will initiate the subsequent processes within the connector such as the establishment of a communication connection to the communication device. The adjustment of the detection unit and particularly of the sensitivity of the detection unit is helpful, as the surrounding conditions of the connector, i.e. the environment where the user is currently using the rendering device may change. In crowded places where a lot of communication devices are present, such as in public transportation, the sensitivity of the detection unit should be set to low, so that only external signals originating from the communication device closest to the user will be detected. It should be noted that dependent on the lay-out of the detection unit and in particular the sensors used, it is also possible that a setting High, instead of the setting Low, may indicate that only signals from communication devices nearby will be detected.

Alternatively or additionally, the detection unit may be set up to, instead of adjusting the sensitivity of the detection unit, adjust the frequency to which the detection unit is sensitive. Thereby a user having a GSM phone could select the GSM frequency band, a user having 3G could select the frequencies corresponding with 3G and so on to eliminate responses to phones from another network or another frequency band of the same network. The connector may have a selection button/knob/switch to select a specific frequency band within a network. These different frequency bands may for example be selected by the user based upon his present location. Thereby the connector can be adjusted to the frequency band used in the country or region where the user is presently located, for example America, Europe, Asia and so on. For example the frequency band of GSM 900 or GSM 1800 may be selected by the user when he is located in Europe or Asia, whereas the GSM 850 or GSM 1900 frequency band may be selected when the user is for example in the USA or Canada. The frequency band to which the detection unit may be adjusted may preferably be the band used for uplink traffic, that means from the mobile phone to the transceiver station, e.g. base station or node B.

In one embodiment, the connector further comprises display means for displaying the settings of the detection unit. For displaying the sensitivity of the detection unit, for example, LED's may be used and the number of LED's illuminated indicates the level of sensitivity. For displaying the selected frequency band a display screen may be provided on the connector, or LED's may be used where the illumination of an LED will indicate the selected frequency band. This indication can be realized by marking different frequency bands to which the connector can be adjusted on the housing of the connector adjacent to the respective LED. In particular for connectors having an adjustment unit for the detection unit, the display of the currently selected setting will be helpful for the user.

According to one embodiment, the connector comprises at least one control unit for controlling the communication with the communication device, in particular for controlling at least part of the functionalities of the communication device. By providing control of the communication device at least partially at the connector, the user does not have to reach for the communication device and can thus respond faster to the present situation such as an incoming call. The control unit therefore preferably comprises at least one input unit for input from the user. The input unit may for example be a button or a switch. The pushing of the button may be received at the control unit as a signal for accepting the incoming call. In this case, the connector may transmit a respective signal via the communication connection to the communication device to establish a communication with the calling party for example via a cellular communication network. Signals subsequently received from the communication device will be forwarded to the connector for forwarding to the output device. Another button or a different activation of the button may be understood by the control unit as a signal for rejecting an incoming call. In that case, the communication device may decline the request signal received via a cellular communication network. Additionally or alternatively, the control unit also controls at least part of the functionalities of the communication unit. In particular, the termination of the communication connection to a communication device may be triggered by using one of the input units, in particular a reject button.

According to one embodiment, the connector comprises a microphone for input of audio signals. By providing a microphone at the connector, it will be possible to not only transmit received signals from the rendering or the communication device to the output device but also to transmit audio signals from the connector to the communication device.

In a preferred embodiment, the control unit of the connector for controlling at least part of the functionalities of the communication device is connected to the microphone. By providing such a connection, the microphone may be activated once a user accepts an incoming call and may be deactivated if the call is terminated. In addition, the microphone may be used for speech control of the communication device.

Preferably, the connector comprises at least one connecting wire or cable for connecting to a rendering device. By offering a flexible connection between the rendering device and the connector, in particular for embodiments where the connector comprises a microphone, the connector can be moved freely without having to move the rendering device. It will, hence, be possible for the user to place the connector close to his mouth, for example by attaching it via a clip to a jacket or tie.

According to one embodiment, the connector is a unit separate from the rendering device and from the output device. By providing a connector which includes the functionalities necessary for managing the transmission of audio signals to the user as a separate entity, the utilization of the connector is extremely flexible. The connector may in particular be used with different output devices and/or rendering devices. Hence, a user will not be forced to replace any of his presently owned rendering devices or output devices, if he wants to be alerted of incoming calls or other events such as an incoming message and wants to use the currently used output device to answer an incoming call. Another advantage of providing a connector which is a separate entity is that the connector can be removed from the connection between the rendering device and the output device. The removal of the connector may be desirable, if the connector cannot be set to a passive state. In that case, the user can remove the connector, if he does not want to be disturbed, while listening to the audio output of the rendering device, e.g. while listening to music.

In order to allow removal of the connector from the connection between the rendering device and the output device, the connector is equipped with connector means, in particular plugs and sockets, that can receive the respective connector means from the rendering device and the output device. Preferably, the connector means, i.e. receiving means and insertion means are designed to be complementary to standard plugs and sockets provided on commercial output devices and rendering devices. By providing standard receiving and insertion means, the connector can be used with different devices without necessitating amendment to the connector or the devices. For reasons of simplicity the receiving means will hereinafter be referred to as socket.

The connector may be designed according to different standards. Hence, the present invention also encompasses connectors which are provided with for example two plugs and do not comprise a socket. Such an embodiment of the connector may be used with an output device and a rendering device according to a standard where both devices have sockets.

The power supply for the connector may be a power source, such as a battery within the connector. It is, however, also possible that the connector derives the necessary power from the rendering device. If the output device is equipped with a power supply, the connector may also obtain the power from this device.

According to a further aspect of the invention, the problem is solved by a method for managing connections to an output device from a rendering and/or a communication device, wherein the output device is connected to a connector for connecting the output device to the rendering and/or communication device. The method is characterized in that the connector upon detection of a specific external signal which was detected wirelessly activates a communication unit of the connector for communication with the communication device.

By only activating a communication unit of the connector upon detection of a specific signal, the power consumption can be minimized, as a permanent connection with the communication device is not necessary. The communication unit of the connector does in particular not have to monitor signals on a connection with the communication device.

The external signal is preferably a signal on a control channel of a mobile communication network standard, in particular GSM, UMTS, EDGE and/or any 3G or 4G-standard. The frequency range may be for example 890-915 MHz and/or 935-960 MHz for a GSM standard network. By detecting signals within such frequency ranges, signals on control channels can be detected. Hence, the connector will be able to detect signals such as the call setup signal, which is generated by a mobile phone, when a call comes in. The detection unit may be set to detect a sequence of signals. The sequence of signals may be the call setup signal of a mobile phone, when a call comes in, the ring tone of a mobile phone or a tone issued by the mobile phone, when an SMS is received or is to be received. By not only monitoring individual signals in the surrounding of the connector, the reliability of the relevance of the detected external signals can be increased.

The detection unit may be set to only detect a preset signal or a preset sequence of signals. It is, however, also possible that the detection unit detects all external signals, e.g. within a preset frequency range, and to select the signal or sequence of signals which should be used for further processing in the connector.

The connector may be set to only detect a specific sequence of signals in this frequency range representative of for example the call setup signal. In addition or alternatively, the detection may be set to or adjusted to only detect signals of specific signal strength. Thereby, signals originating form a mobile phone close to the user will be detected, whereas other signals within this frequency range originating from other mobile phones will be ignored.

The external signal may also be a ring tone emitted by the communication device. In this case the detection unit of the connector is set to detect a sequence of audio signals predefined by the ring tone selected by the user. The usage of the ring tone of a communication device as an external signal is, however, less preferred, as the ring tone might be difficult to detect on noisy environments and may not be unique to the user.

One advantage of using an external signal which is detected wirelessly at the connector for activating the communication unit is that no user input is necessary. The manual activation of a communication unit would require the user being aware of an incoming call, which is not the case, if the user for example is listening to music and can thus not hear a ring tone emitted by the communication device.

According to one embodiment, the communication unit upon activation by the detection unit establishes a communication connection, preferably a Bluetooth connection, to the communication device. This communication connection can then serve for transmission of audio signals to and from the communication device and can also serve for transmission of control signals. In particular a control signal for determining the status of the communication connection can be transmitted. The status of communication may for example be "receiving incoming call" or "idle". By signalling the respective control signals, the status of the communication unit may be used for further processing in the connector. In particular, specific units of the connector may be activated only if a required status of the communication device is detected. The connector may also de-activate units dependent on the status of the communication device. One possible status for de-activation of for example the communication unit is "call terminated".

According to one embodiment, the external signals are detected at the connector according to adjustable parameters of the detection unit. The adjustable parameters may be the signal strength, the signal duration and/or signal sequence. These parameters can be set by the user at the connector, for example via adjustment buttons. Alternatively, at least part of the parameters may be preset within the connector during manufacturing.

Preferably, a microphone at the connector is activated at the connector upon establishing a communication connection with the communication device. The microphone may be activated immediately upon establishing of the communication connection. In this case, the microphone may be controlled by the communication unit of the connector. This will allow speech control of the communication device. A user may in this case for example use speech commands to accept or reject the call, instead of pressing a button or knob. Alternatively or additionally, the microphone may be activated by user input for initiating transmission of audio signals via the communication connection. The user input may be the pushing of a button at the connector for accepting a call that is coming in at the communication device.

The transmission of signals from a rendering device to an output device is interrupted upon detection of the external signal at the connector. The interruption may be triggered immediately after the specific external signal has been detected. Alternatively the interruption of the transmission may be postponed until a communication connection with the communication device has been set up and possibly until the status of the communication device has been confirmed to be receiving an incoming call.

Once the transmission of signals from the rendering device to the output device is interrupted within the connector, signals received from the communication device via the communication connection at the connector are transmitted to the output device instead. The signals transmitted to the output device preferably only include audio signals. Hence, control signals which may be exchanged between the communication device and the connector will not be transmitted to the output device.

According to a further embodiment, the communication connection between the connector and the communication device will be terminated and/or the communication unit of the connector will be de-activated upon detection of the absence of a specific external signal. The specific external signal, the absence of which will trigger the termination of the communication connection and/or the de-activation of the communication unit, may be the control signals emitted by a mobile phone to a base station or node B during a call. By providing the possibility of automatic termination of the communication connection for such a situation, the reliability of the connector is improved. Even if the user omits to terminate the communication connection upon termination of a call and no other unit such as the communication unit of the connector terminates the connection, the detection unit may trigger the termination.

The method according to the present invention is preferably carried out with the inventive connector.

Advantages and features described with respect to the connector also apply to the method accordingly and vice versa.

The invention will now be described again with reference to the enclosed figures, wherein:

DETAILED DESCRIPTION OF THE PREFERRED EMBODIMENT

Figure 1:
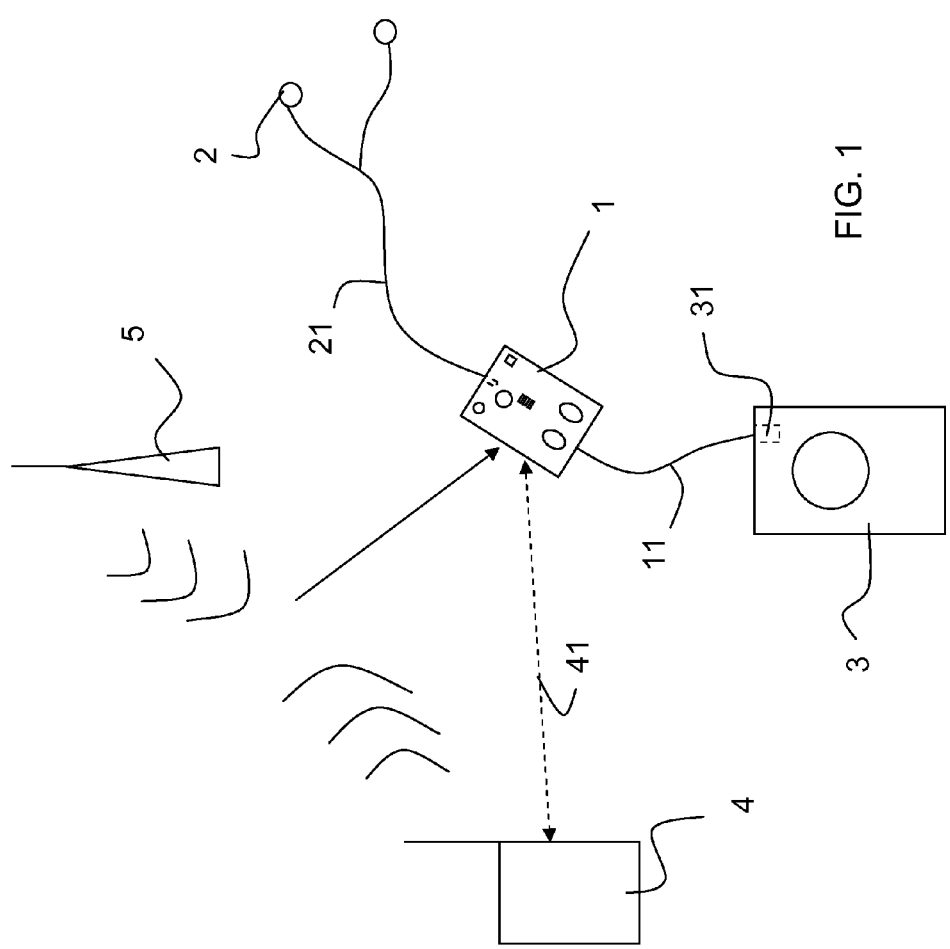
FIG. 1 shows a schematic view of a connector according to the present invention, in a connected state.

In FIG. 1 a connector 1 is connected to an output device 2 depicted as a headset 2. The connector is further connected to a digital music player 3. The connector 1 can also communicate with a mobile phone 4, which is connected to a cellular communication network which is represented in FIG. 1 by a base station 5.

The connector 1 is connected to the music player 3 via a cable 11 firmly attached to the connector 1. The cable 11 is plugged into the music player 3. The connection to the headset 2 is established via cable 21 of the headset 2, which is plugged into the connector 1. The mobile phone 4 exchanges signals with the base station 5 of the mobile communication network. The signalling between the mobile phone 4 and the base station 5 is schematically indicated in FIG. 1. Part of this signalling may be detected by connector 1, as is indicated in FIG. 1 by the arrow and will be described in more detail with reference to FIGS. 2 and 3. In addition, the mobile phone 4 may exchange signals with the connector 1 via a communication connection 41, which is preferably a Bluetooth connection.

Figure 2:
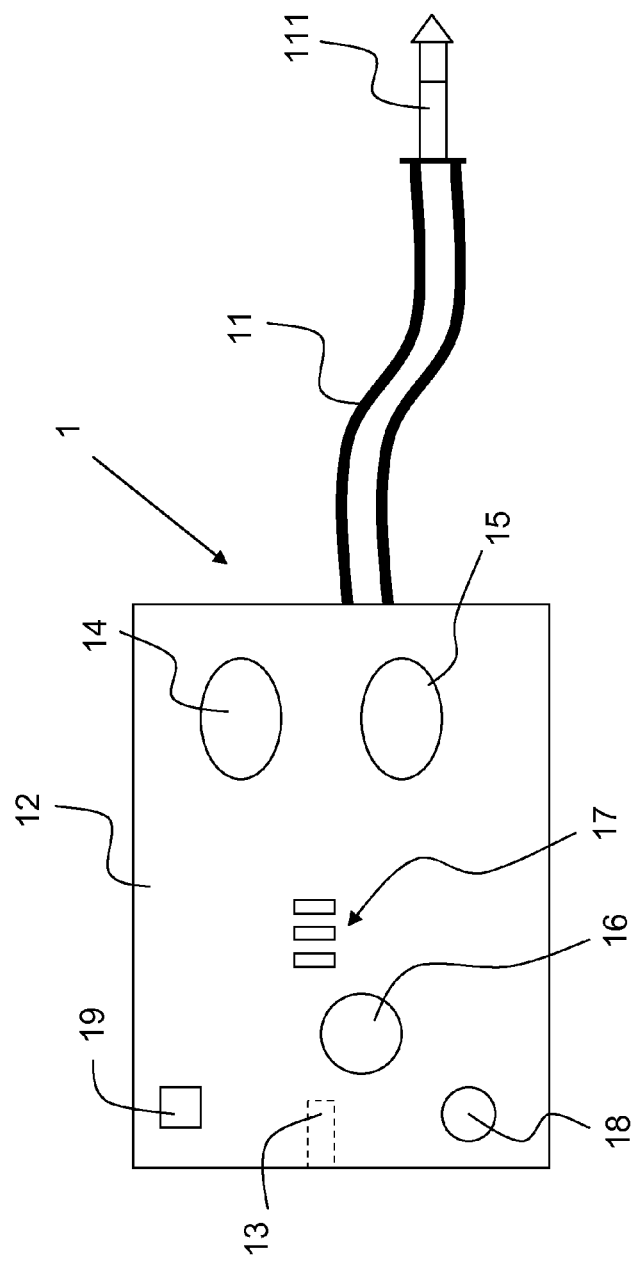
FIG. 2 shows a schematic view of an embodiment of the connector according to the invention.

One embodiment of the connector 1 is shown in FIG. 2. The connector 1 has a cable 11 connected to a casing 12. At the loose end of the cable 11, i.e. at the end where the cable 11 is not attached to the casing 12, a plug 111 is provided. This plug 111 can be inserted in a respective socket 31 of the music player 3. The socket 31 is schematically shown in FIG. 1. At the side of the casing 12 opposite to the cable 11, a socket 13 is provided at the connector 1. This socket 13 can be used to insert a plug (not shown) from the cable 21 of the headset 2. At the upper side of the casing 12 two buttons 14, 15 for controlling the connection to the mobile phone 4 are provided. Button 14 may for example be a reject button for rejecting incoming calls and button 15 may be an accept button for accepting incoming calls. A button or knob 16 is provided for adjusting settings of the connector 1. The settings may be displayed at the display means 17, which are depicted as three LED's. Furthermore a microphone 18 is provided at the connector 1. Finally, in embodiment shown in FIG. 2, a display or indicator 19 for indication of a connection status of the connector 1 to the mobile phone 4 is provided at the casing 12.

Figure 3:
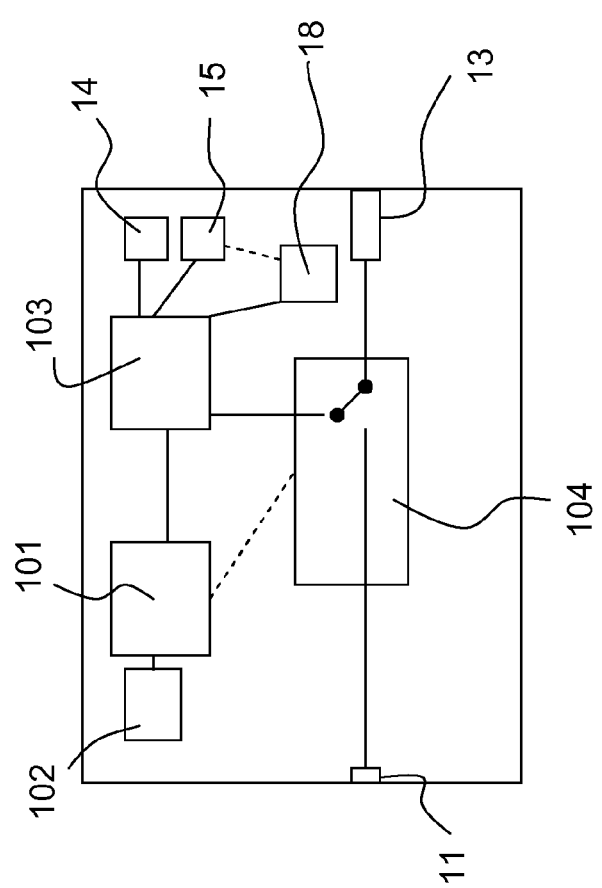
FIG. 3: shows a schematic block diagram of an embodiment of the connector according to the present invention.

Some of the units included in the connector 1 are schematically shown in FIG. 3. A detection unit 101 is connected to an adjustment unit 102. The adjustment unit 102 may be controlled by the adjustment button or knob 16. A communication unit 103 for communication with the mobile phone 4 is connected to the detection unit 101. Also buttons 14, 15 as well as the Microphone 18 are connected to the communication unit 103. Buttons 14 and 15 are also referred to as a control unit. An interruption unit 104 is interposed between the socket 13 for receiving a plug from the cable 21 of the headset 2 and the cable 11 for connecting the connector 1 to the music player 3. The interruption unit 104 can interrupt transmission of signals from the cable 11 to the socket 13. In addition, the interruption unit 104 can connect the socket 13 to the communication unit 103 for transmission of signals from the mobile phone 4 to the headset 2. As shown in FIG. 3 the interruption unit 104 can be activated by the communication unit 103 and/or by the detection unit 101. The communication unit 103 or the interruption unit 104 may comprise a storage unit (not shown) for preset or pre-recorded ring tones. Alternatively, this storage unit may be realized as a separate unit.

The functioning of the connector 1 in the embodiment as shown in the Figures will now be explained in detail. If a user is listening to music from the music player 3 via his headset 2, the interruption unit 104 will be in a state to transmit all signals received from the music player 3 via cable 11 to the cable 21, plugged into socket 13. If a phone call is to be established with the mobile phone 4, the base station 5 will emit signals to the mobile phone 4. The mobile phone 4 may, upon receipt of the signal respond by sending its identifying information to the base station 5, along with a message confirming that it received the page, via a control channel. At that point voice channels for conducting the phone call will be assigned.

Depending on the network standard, the frequency used for signalling between the mobile phone 4 and the base station 5 is different. In a GSM-900 network the uplink signalling from the mobile phone 4 to the base station 5 will for example be carried on in a frequency range or channel of 890-915 MHz and the downlink signalling from the base station 5 to the mobile phone 4 will be carried out in a frequency range or channel of 935-960 MHz. Depending on the network other frequencies will be used. For example, for a GSM-1800 network the uplink signalling will be carried out in the frequency range of 1710-1785 MHz and the downlink signalling. It is to be noted that these frequency bands are only examples and that the present invention may be applied to any frequency band which is being used in the respective network. Within these frequency channels logical channels are established. For example control channels are used. These control channels will only carry cellular system data. Via these channels for example the signalling for call setup will be conducted.

The signals emitted from the mobile phone 4 to the base station 5 can be detected by the detection unit 101 of the connector 1. The detection unit 101 is in particular set to detect the call setup signal. Once the detection unit 101 has detected such an external signal it will activate the connection unit 103 of the connector 1. The detection unit 101 will also activate interruption unit 104 and the transmission of signals from the music player 3 to the headsets 2 will be interrupted. At this point a ring tone may be output from the connector 1 to the headset 2.

Once activated, the communication unit 103 will set up a communication connection, in particular a Bluetooth connection with mobile phone 4. The pairing of the connector 1 to the mobile phone 4 will be established based upon settings within the connector 1, i.e. a preselected mobile phone 4 will be paired with the connector 1.

The status of the connection from the connector 1 to the mobile phone 4 will be indicated to the user by means of the indicator 19. If there is no connection to the mobile phone 4, the indicator 19, which may be a light, will be turned off. During the setting up of the connection, i.e. the pairing, the light of display 19 may blink. Once the mobile phone 4 is connected, the light will be on continuously.

Once the mobile phone 4 is connected to the connector 1 via Bluetooth, the connector 1 may determine the status of the mobile phone 4, in particular whether there is indeed an incoming call at the preselected mobile phone 4. If there is an incoming call at the mobile phone 4, the communication unit 103 will activate the buttons 14, 15 for user input. At this point the user can decide if he wishes to accept or reject the call.

If the detection unit 101 did not activate the interruption unit 104 at the time of activation of the communication unit 103, the communication unit 103 may activate the interruption unit 104 at the point where a connection to the mobile phone 4 has been set up and the existence of an incoming call potentially has been verified. At the latest at this point, the user will be alerted that there is an incoming phone call on his mobile phone 4.

If the user accepts the call, by pressing the accept button 15, the microphone 18 will be activated by the communication unit 103 or by the accept button 15 directly.

At this point, the user can have a telephone conversation via the mobile phone 4, using the headset 2, which he previously was using for listening to music, to listen to the other party and using the microphone 18 of the connector 1 to talk to the other party.

If the user wishes to terminate the call, he can use the reject button 14, which will terminate the phone call and will also terminate the Bluetooth connection from the mobile phone 4 to the connector 1. The communication unit 103 will become inactive again and will thus not consume power. If the communication unit 103 is inactivated, the interruption unit 104 will be inactivated as well and the user can listen to the music from the music player again 3.

In order to avoid interruptions of the user caused by mobile phones in the vicinity, the connector 1 has an adjustment button 102 for adjusting the sensitivity of the detection unit 101. By lowering the sensitivity, only signals from a mobile phone 4, which is in the immediate vicinity of the user, will be detected. As the requirements to the sensitivity of the detection unit 103 will change according to the circumstances such as the number of people close by, the expectation of an incoming phone call etc., the current setting of the sensitivity level will be indicated to the user by means of the display 17. If all three of the LED's of the displays 17 are illuminated, the sensitivity will be set to high and the detection unit 101 will detect signals, even if they originate from a mobile phone which is further away.

Another way to avoid disturbance of the user by phone calls intended for mobile phones other than his own, is by only interrupting the transmission of signals from the rendering device 3 to the head set 2 once the communication unit 103 has confirmed the incoming call at the preselected mobile phone 4.

The present invention is not limited to the depicted embodiment. Single units or parts of the connector, such as for example the adjustment unit and the adjustment button or the display, may be omitted or may be included in other units of the connector. Different lay-outs of the connector can be used. Also the units within the connector as shown in FIG. 2 can be laid out differently and may in particular be partially combined. Also additional units may be provided. Such a unit may for example be a filter. The filter may be used to filter detected signals according to a threshold of the signal strength and/or to filter a preset signal sequence out of a number of signals detected. The latter filter may be used to detected signal frequencies in advanced communication networks such as 3G or 4G networks.

The connector may also be used for other rendering devices than the depicted digital music player. For example a TV or a stereo system can be connected to loud speakers with the connector being interposed in the connection.

The units of the connector are realized as hardware and/or software units.

As described in detail above, a preferred embodiment of the connector according to the present invention comprises a detection unit which is set to and/or can be adjusted to detect signals in the frequency range of control channels of a mobile communication standard, in particular GSM and/UMTS and/or EDGE. Upon detection of an incoming call signal from a mobile device that is located within a preset range, an interruption unit interrupts the connection from the rendering device to the output device and activates the Bluetooth unit. Only then the Bluetooth unit will establish a connection to a pre-paired mobile device and continues acting as if directly connected to the mobile device. The accept and reject call buttons become activated and can be pressed by the user to either answer or reject the call. A blue light on the connector indicates the status of the Bluetooth connection and of a Bluetooth radio in the connector. Furthermore, pressing the accept button to accept the call will also activate the microphone inside the connector. The connector will have a wire towards the plug that connects to the rendering device and will have a fastening means such as a clip to keep the connector close to the user's mouth.

A cellular base station will send out signalling information to a mobile device. The device will respond with transmitting signalling information which is detected by a detecting unit which is located inside the connector. The sensitivity of the detecting unit can be adjusted with a button and indicators will show the currently selected sensitivity status. Upon detecting call alert signalling, the interruption unit will interrupt the audio signal from the digital music outputting device and will activate the Bluetooth unit. The Bluetooth unit will start pairing with the mobile device and will switch on the microphone. Via the Bluetooth connection and the connector and the wire, the calling signal from the phone is led to the rendering device. The LED indicator will now be lighted continuously indicating a Bluetooth connection between the device and the mobile phone. The user can now select to accept the call and press the accept button or to reject the call with the reject button. Once the call is ended or rejected, the connector will disconnect from the mobile phone, switch off the Bluetooth unit and also the interruption unit will stop the interruption of the audio signal from the audio device.

The invention allows a user to listen to the music via wired headphones and not miss any incoming phone calls. The invention does not require any of the equipment to be adapted and is independent from the device producing the audio signals and the wired headphones. It is very easy to use. The user plugs in the connector between the rendering device and the output device and will be able to listen to music and will still be alerted of an incoming call and will be able to receive the call with the headsets used for listening to music. In addition, the power consumption of the connector is minimized by only activating the communication unit, once a nearby mobile phone emits signals indicating an incoming call.

REFERENCE NUMBERS

1 Connector
11 Cable
111 Plug
12 Casing
13 Socket/Receiving means
14 Reject button
15 Accept button
16 Adjustment button
17 Sensitivity Display
18 Microphone
19 Indicator Bluetooth connection
2 Headset
21 Cable
3 Digital music player
31 Receiving means of music player
4 Mobile phone
41 Bluetooth connection
5 Base station
101 Detection unit
102 Adjustment unit
103 Communication unit
104 Interruption unit

The invention claimed is:

1. A connector for connecting at least one output device to a rendering device, wherein the connector comprises at least one detection unit for detecting at least one external signal and at least one communication unit for communicating with at least one wireless communication device wirelessly, wherein the detection unit is set to and/or can be adjusted to detect signals in the frequency range of control channels of a cellular mobile communication standard and wherein the detection unit is connected to the communication unit for activating the communication unit for establishing a communication connection between the communication unit of the connector and the wireless communication device.

2. The connector according to claim 1, characterized in that the connector comprises at least one interruption unit for managing the connection of the rendering device to the output device.

3. The connector according to claim 2, characterized in that the communication unit is connected to the interruption unit.

4. The connector according to claim 1, characterized in that the communication unit is a personal area network communication unit, in particular a Bluetooth unit.

5. The connector according to claim 1, characterized in that the connector comprises an adjustment unit for adjusting the detection unit.

6. The connector according to claim 1, characterized in that the connector comprises at least one display means for displaying the settings of the detection unit.

7. The connector according to claim 1, characterized in that it comprises at least one control unit for controlling the communication with the communication device, in particular for controlling at least part of the functionalities of the communication device.

8. The connector according to claim 1, characterized in that the connector comprises a microphone for input of audio signals.

9. The connector according to claim 8, characterized in that the microphone is connected to a control unit of the connector and/or to the communication unit.

10. The connector according to claim 2, characterized in that the communication unit is a personal area network communication unit, in particular a Bluetooth unit.

11. The connector according to claim 3, characterized in that the communication unit is a personal area network communication unit, in particular a Bluetooth unit.

12. The connector according to claim 1 wherein the signals to be detected by the detection unit are call setup signals.

13. A method for managing connections to an output device from a rendering and/or a communication device, wherein the output device is connected to a connector for connecting the output device to the rendering and/or communication device, characterized in that a detection unit of the connector can detect signals in the frequency range of control channels of a cellular mobile communication standard and wherein the detection unit upon detection of a specific external signal in the frequency range of control channels of a mobile communication standard which was detected wirelessly by the detection unit of the connector activates a communication unit of the connector for establishing a communication connection with the communication device.

14. The method according to claim 13, characterized in that the communication unit upon activation establishes a communication connection, preferably a Bluetooth connection, to the communication device.

15. The method according to claim 13, characterized in that the connector activates and/or deactivates units dependent on the status of the communication device.

16. The method according to claim 13, characterized in that the external signals are detected according to adjustable parameters of the detection unit.

17. The method according to claim 13, characterized in that a microphone at the connector is activated at the connector upon establishing a communication connection with the communication device.

18. The method according to claim 13, characterized in that the transmission of signals from a rendering device to an output device is interrupted upon detection of the external signal at the connector.

19. The method according to claim 18, characterized in that signals received from the communication device at the connector via the communication connection are transmitted to the output device.

20. The method according to claim 13, characterized in that the communication connection between the connector and the communication device will be terminated and/or the communication unit of the connector will be de-activated upon detection of the absence of a specific external signal.

21. The method according to claim 13, characterized in that it employs a connector.

22. The method according to claim 14, characterized in that the connector activates and/or deactivates units dependent on the status of the communication device.

23. The method according to claim 14, characterized in that the transmission of signals from a rendering device to an output device is interrupted upon detection of the external signal at the connector.

24. The method according to claim 14, characterized in that the communication connection between the connector and the communication device will be terminated and/or the communication unit of the connector will be de-activated upon detection of the absence of a specific external signal.

25. The method according to claim 14, characterized in that it employs a connector.

26. The method according to claim 13 wherein the signals to be detected by the detection unit are call setup signals.

* * * * *